Feb. 23, 1932. M. GRANT 1,846,052
CONTAINER AND METHOD FOR SEALING JELLY OR PRESERVES
Filed June 12, 1929
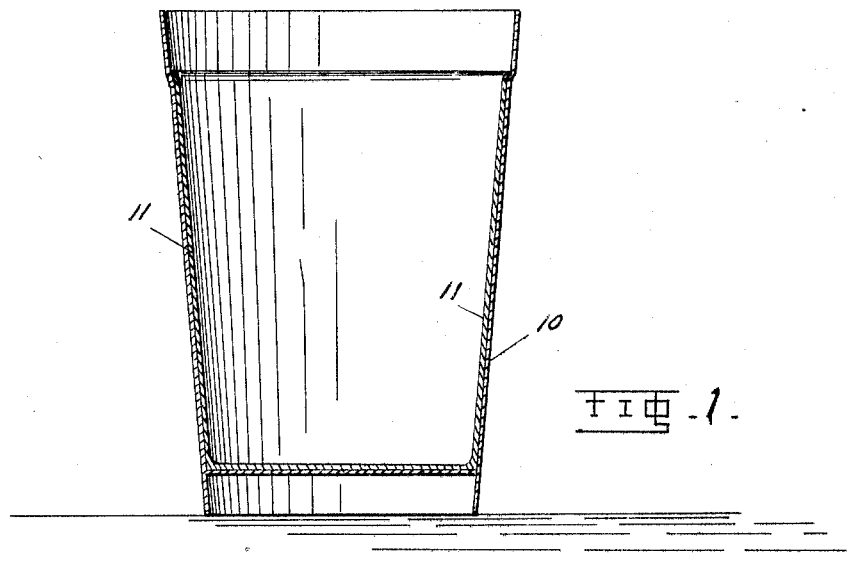
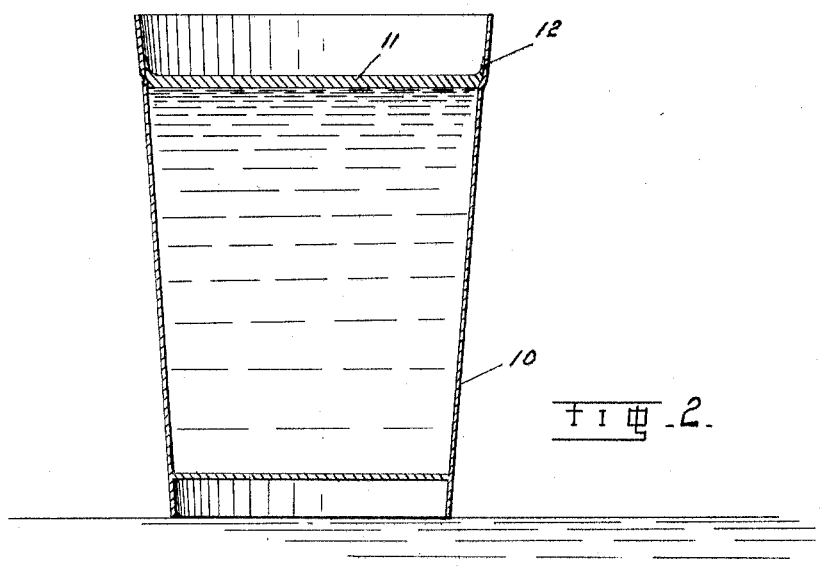
INVENTOR.
MARGARET GRANT.
BY
ATTORNEYS.

Patented Feb. 23, 1932

1,846,052

UNITED STATES PATENT OFFICE

MARGARET GRANT, OF AKRON, OHIO

CONTAINER AND METHOD FOR SEALING JELLY OR PRESERVES

Application filed June 12, 1929. Serial No. 370,184.

This invention relates to methods for sealing jellies, preserves, etc. in containers and to containers for use in sealing jellies or preserves in accordance with said method.

It has heretofore been proposed by the present inventor to provide a method for sealing jellies or preserves in containers and also a container for jelly or preserves in which a quantity of sealing material, such as paraffin is provided in the bottoms of the containers and is melted by the heat of the prepared jellies which are poured therein while hot, and which floats to the surface of the jelly and cools therewith to provide an effective seal over the top of the jelly.

It has been found that if, instead of providing a quantity of the sealing material in the bottom only of the container, a sufficient quantity to form a seal is distributed over the bottom and wall of the container to adjacent the top or lip thereof, and the jelly is poured into such a container while hot, a more effective seal is secured. It has also been found that if the entire mass of sealing material is placed in the bottom of the container, by reason of the heat rising that in many cases the heat of the contents is not sufficient at the bottom of the container to entirely melt the sealing mass and a portion of said mass is left in the bottom of the container, thereby detracting from the efficiency of the seal.

The present invention as briefly set forth in the preceding paragraph is embodied in and adapted to be carried out by the container and method as illustrated in the accompanying drawings and described below. It is to be understood that the invention is not limited to the specific form thereof shown and described.

Of the accompanying drawings;

Figure 1 is a vertical diametral section through a container embodying and adapted to carry out the invention; and Figure 2 is a similar view showing the container filled with hot jelly or the like and sealed.

Referring to the drawings, the container 10 which may be of paper, glass, etc. is coated with a sufficient quantity of a sealing substance 11 of low melting point and low specific gravity, such as paraffin to provide a sealing layer of sealing material on the surface of jelly or the like filled in said container, the paraffin being applied to the bottom of the container and on the wall thereof to adjacent the top or lip of the container.

This provides a comparatively thin layer of paraffin which is subjected to the action of a large area of hot jellies poured into the container insuring that the paraffin will all be melted and will float to the top thereof to form the seal. The proximity of the paraffin to the wall of the container for some reason results in a better adhesion of the sealing layer of paraffin to the wall of the container. When the container is of glass, the paraffin also serves to absorb the heat of the jelly in sufficient quantities to reduce the likelihood of breakage.

The jelly is preferably poured into the container so that its surface is below the upper edge of the paraffin layer coated on the wall of the container, whereby the extreme upper portion of the paraffin layer is not entirely liquefied and the liquid paraffin in the sealing layer formed while the jelly is hot seals with the original unliquefied coating as at 12, Figure 2, to provide a perfect seal at the edge of the paraffin.

It will be apparent from the foregoing that the prior invention of the present invention has been substantially improved by this discovery. Obviously modifications of the present invention may be resorted to without departing from the spirit thereof or the scope of the appended claims.

What is claimed is:

1. A sealing container for jellies or the like, having its bottom and wall coated with a sufficient quantity of a sealing substance of low melting point and low specific gravity forming a comparatively thin layer thereon to melt and form a sealing layer on the surface of hot jelly or the like poured therein, said coating extending to adjacent the top of said container.

2. That method for sealing jelly or the like in containers comprising applying a comparatively thin layer of a sealing substance of low melting point and low specific gravity to the bottom and wall of a container to adjacent the top thereof, and pouring jelly or the like into said container while hot to a height beneath the upper edge of said layer to melt said substance whereby it will float to the surface and form a sealing layer thereover as the jelly cools.

MARGARET GRANT.